May 26, 1942. A. KORSMO ET AL 2,284,433
GRAIN PAN FOR COMBINES
Filed Jan. 25, 1940 2 Sheets-Sheet 1

Inventors
ALFRED KORSMO
MARTIN RONNING
By Carlsen & Hagle
Attorneys

Inventors
ALFRED KORSMO
MARTIN RONNING

Carlsen + Hazle
Attorneys

Patented May 26, 1942

2,284,433

UNITED STATES PATENT OFFICE 2,284,433

GRAIN PAN FOR COMBINES

Alfred Korsmo, Hopkins, and Martin Ronning, St. Louis Park, Minn., assignors to Minneapolis-Moline Power Implement Company, Minneapolis, Minn., a corporation of Delaware Application January 25, 1940, Serial No. 315,592

12 Claims. (Cl. 130—27)

This invention relates to improvements in grain pans such as used in combines or combination harvesters and threshers of the type which cut the crop, thresh it and segregate the grain from the straw and like products all in a continuous operation.

Such implements include a threshing mechanism by which the crop is threshed to remove the grain and which grain, together with chaff, particles of leaves, unthreshed heads, and other tailing, are carried by an inclined and vibrating grain pan to sieves which make the final separation of the grain from such tailings. A cleaning fan or blower forces air through the sieves to blow out the lighter material. It is obvious that the material must be discharged from the grain pan onto the sieves evenly across the entire width both in order to fully utilize the cleaning area of the sieves and also to prevent the air blast from blowing through thin streaks or areas of the material and possibly blowing grain outwardly from the machine. This problem is made more difficult in some cases by the fact that the width of the discharge end of the grain pan and of the sieves is less than that of the threshing mechanism and a resulting tendency of the grain to be discharged in thicker streams along the sides of the pan and sieves.

The primary object of our invention therefore is to provide a grain pan of improved construction and conformation by which the grain and other matter will be guided and directed in proper manner to insure its even depth or distribution across the entire width of the discharge end of the pan and of the sieves. Another object is to provide a rearwardly tapering grain pan with a relatively narrow discharge end and in which the shape of the pan itself, as well as the provision of guide strips thereon, will prevent the usual tendency of the grain to collect in heavier streams along the converging sides of the pan.

These and other more detailed and specific objects will be disclosed in the course of the following specification, reference being had to the accompany drawings, in which—

Figure 1:
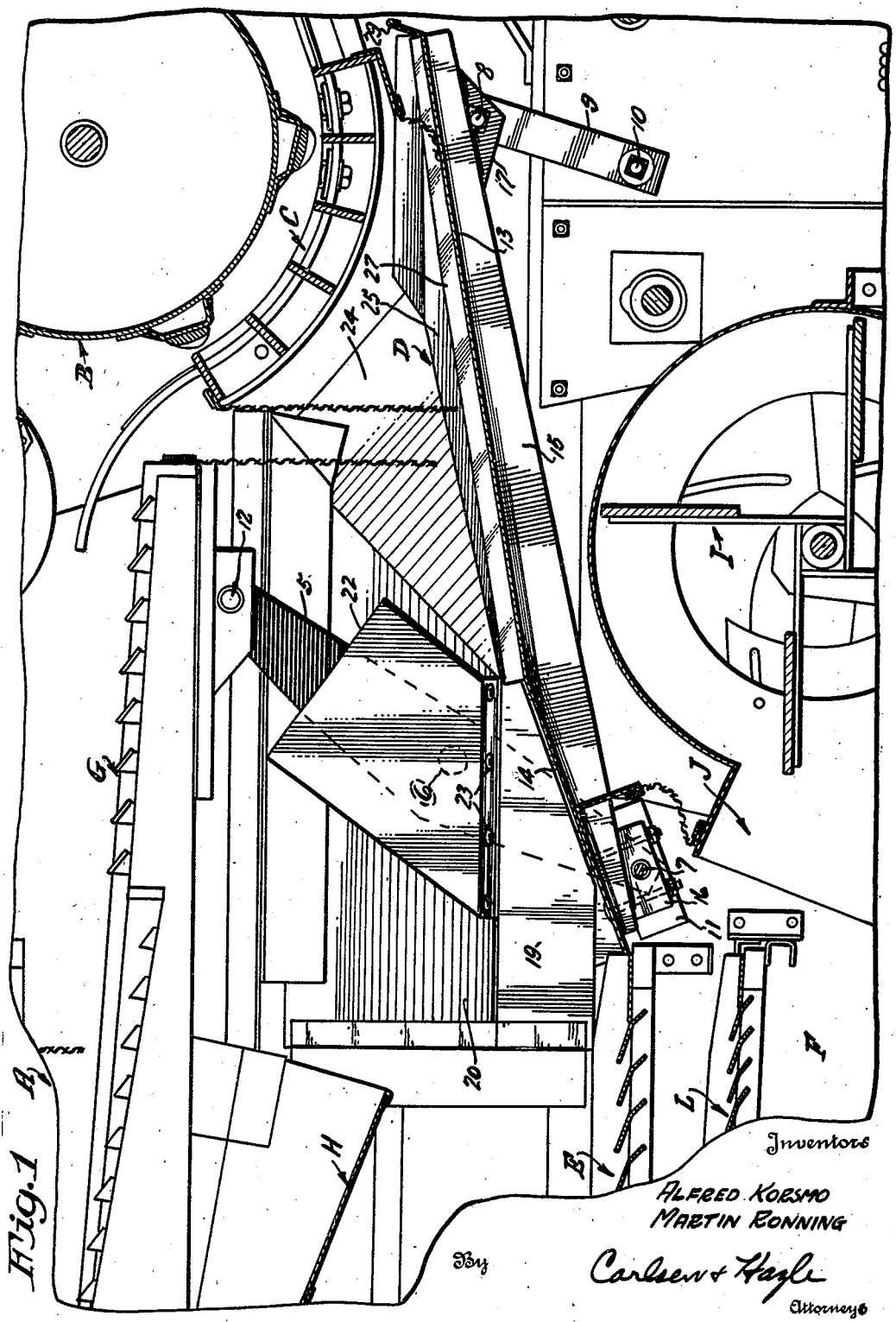
Fig. 1 is a fragmentary vertical and longitudinal section through a combine showing portions of the threshing mechanism, sieves and blower fan thereof and with our improved grain pan in use therein.
Figure 2:
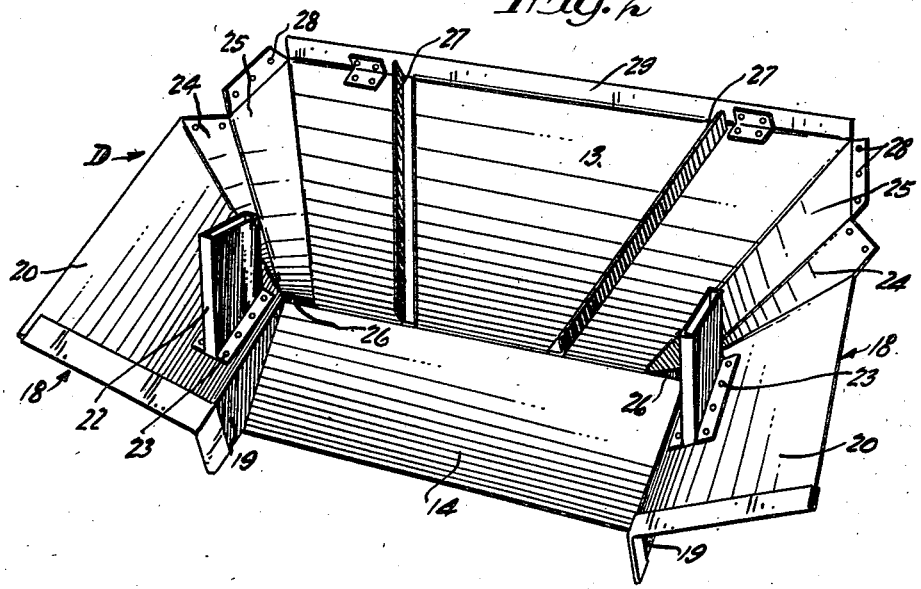
Fig. 2 is a perspective view, looking downwardly and forwardly, of the pan alone.
Figure 3:
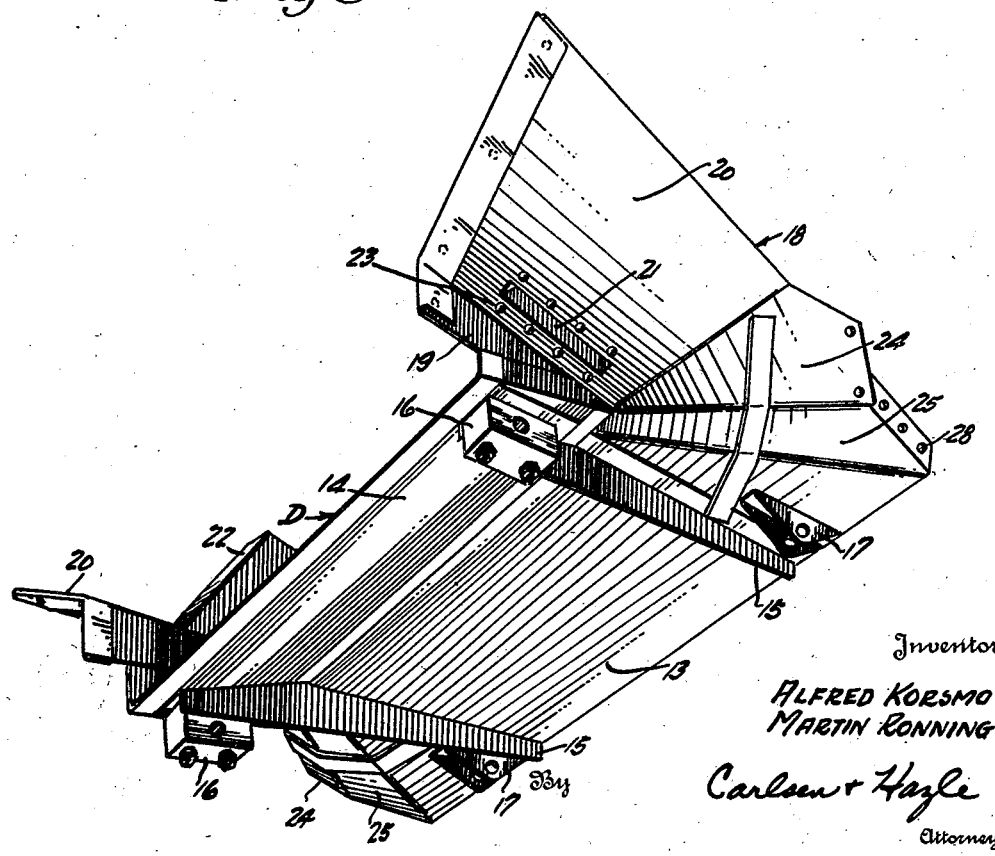
Fig. 3 is another perspective view of the pan, in this case looking forwardly and upwardly at the underside thereof.

The grain pan of our invention finds particular use in the combine of the kind described in application Serial No. 313,831, filed January 15, 1940, of Martin Ronning, to which attention is invited for a more complete disclosure of the combine structure and operation. The pan, however, may be used in other types of combines if so desired.

Referring now more particularly and by reference characters to the drawings, A designates generally the combine housing which is carried over the field upon wheels with a forwardly arranged header and conveyor device (not shown) arranged to cut the crop or grain and carry it to the threshing mechanism comprising a rotating rasp cylinder B and underlying concave or grate C. The kernels thus rubbed from the crop, together with such tailings material as unbroken heads, leaves, and chaff falls to the upper end of the rearwardly sloping grain pan D which conveys this material rearwardly and downwardly to discharge upon the upper or chaffer sieve E of the cleaning shoe F. The straw is worked back over the concave C to straw rack G which tosses it rearwardly, and such grain and other small matter as is thus shaken out falls to the grain pan or is returned to the cleaning shoe directly by return pan H.

The grain pan D is given a longitudinal tossing or vibrating motion of limited amplitude by rocker arms 5 at each side (only one here shown) which fulcrum at 6 on the sides of housing A and at lower ends are connected to a cross rod 7 supporting the rear end of the pan. The forward end of the pan is pivoted by bolts 8 upon the upper ends of swinging link arms 9 which are pivoted at lower ends 10 on the housing. An oscillating motion is imparted to the rocker arms 5 by exterior drive mechanism of conventional form (not shown) and the grain pan will of course have a resulting lengthwise tossing and pitching motion such as to feed the grain toward its rear and lower discharge end as will be evident.

The forward end of the cleaning shoe F is also supported by bearing blocks 11 on the rod 7 and the forward end of the straw rack G is connected to the upper ends of the rocker arms 5 at 12 to give these parts a similar motion.

A blower or cleaning fan I is located forwardly of the cleaning shoe F with its discharge J upwardly and rearwardly directed to blow air upwardly through both the upper sieve E and lower sieve L of the shoe, and thus blow out all lighter particles such as chaff and the like, from these sieves. These particles are discharged out through the rear of the machine onto the ground, while the clean grain dropping through the sieves is conveyed out for storage and periodic removal from the combine.

It is quite evidently important that the grain and other material leaving the rear edge of the grain pan D should be evenly distributed across its entire width and thus move across the sieves in the cleaning shoe in a stream of substantially constant depth or density. Otherwise the air from the fan I, taking the path of least resistance of course, will have a tendency to blow through any light or thin streaks in the stream and will not only render the separating action far less effective, but will in some cases blow out the grain itself, resulting in a useless loss.

The side walls of the housing A slope inwardly and downwardly at their lower portions and the width of the cleaning shoe F is considerably less than that of the cylinder B and concave C. The grain pan D must accordingly taper or diminish in width rearwardly toward its discharge end and thus the even distribution of the material flowing off its discharge end is naturally even more important in order to overcome the natural tendency of the grain as it falls from the concave to follow or hug the converging sides of the pan.

Our improved grain pan comprises a substantially flat bottom 13 which tapers or diminishes in width rearwardly and at its rear discharge portion, apron or end 14 may be inclined slightly downward with respect to its larger frontal portion. Stringers or ribs 15 extended in parallelism lengthwise in the underside of this bottom serve to render the same rigid. Bearing blocks 16 are secured in transversely spaced and aligned relation to the rear lower side of the pan bottom to receive the aforesaid cross rod 7 while apertured brackets 17 at the forward lower side receive the bolts 8 for connection to the link arms 9. These mountings constitute the whole support for the weight of the pan while at the same time serve to impart the tossing motion thereto as previously described.

The grain pan has side members designated generally at 18 along both longitudinal margins and said side members include vertical, upstanding side walls 19 extended along the length of the discharge end 14 and terminating upwardly in wide outwardly flaring wings 20. Openings 21 in these wings 20 clear the rocker arms 5 and guard boots 22 are secured at 23 over the openings to receive the upper end portions of said arms and prevent the escape of grain down along these arms. Forwardly of the wings 20 the side members incline downwardly and inwardly at a relatively steep angle over the areas 24 and then at a lesser inclination over the areas 25 to finally meet the margins of the pan proper 13 and these inclined portions serve as guides or deflector surfaces for the grain. It will be noted that the more gradually inclined portions 25 of these guides terminate or meet the pan 13 on converging lines the rear ends of which are spaced inwardly of forward ends of the side walls 19 as designated at 26.

Rearwardly converging and longitudinally extending guide strips or members 27 are secured atop the pan 13 and at their rear ends terminate at the beginning of the more steeply inclined discharge end 14 of the pan in spaced relation and substantially inwardly of the side walls 19.

The free margins of the side members 18 are apertured as designated generally at 28 to mount rubber or fabric sealing strips (not shown) which are of conventional form and serve to prevent grain from working down alongside the pan. The forward end of the pan 13 has an upstanding flange 29 to prevent material from moving thereover.

In the operation of the machine grain and other material from the threshing cylinder B and concave C falls to the pan substantially across the entire width of the forward end thereof. Grain falling upon the guide or deflector surfaces 24—25 will be deflected thereby inwardly over the areas of the pan outside the guide strips 27 and will accordingly flow to the discharge end 14 of the pan in streams of even density or of widths roughly corresponding to the distance between lower, rear ends of the strips 27 and the adjacent side walls 19. Grain falling onto the pan between the strips 27 will flow downwardly and be diminished in width so that the stream will fill out between the streams flowing outside the strips and provide a mass of material of even distribution, and density or depth, across the entire width of the discharge end of the pan. Thus the material will be evenly distributed over the sieves E and L when it reaches the cleaning shoe F, to secure a consequent maximum of effectiveness from the cleaning process as well as prevent the air blast from the fan from unevenly or adversely effecting the grain. The terminating of the lower ends of the deflector wings 25 inwardly of the side walls 19, as at 26, overcomes the tendency of the material to collect particularly along such side walls as it falls over the discharge end of the pan, and thus aids in proper movement and handling of the material.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A grain pan structure for a combine comprising a pan, inwardly sloping side members on opposite lateral margins of the pan, rocker arms for vibrating the pan and extended in upright planes at either side thereof, the said side members having openings to clear the rocker arms, and boots secured to the side members and loosely enclosing portions of the said rocker arms.

2. A grain pan structure and mounting for a combine, comprising rocker arms and pivoted links mounted in spaced relation, a grain pan having a bottom member, bearing blocks secured beneath one end of the bottom member for connection to the rocker arms, bearing brackets secured beneath the opposite end of the bottom member for connection to the said links, and bracing stringers extending lengthwise beneath said bottom member.

3. A grain pan for a combine and adapted to receive falling grain from a threshing mechanism and convey said grain rearwardly to a cleaning mechanism, comprising a pan disposed longitudinally in the combine in a rearwardly sloping position and having a forwardly disposed main bottom portion tapering rearwardly to a relatively narrow and relatively short discharge end portion, said discharge end portion being bent downwardly and rearwardly at a sharper slope than the longer forward bottom portion of the pan, upright side walls extending from the sides of the discharge end portion and flaring outwardly and upwardly at their upper portions, and said flaring portions extending forwardly and meeting at lower edges with the forwardly diverging sides of the main bottom portion of the pan along lines which at rear ends are located inwardly with respect to said upright side walls.

4. In a combine, means for conveying grain from the threshing mechanism to a relatively narrower cleaning mechanism, comprising a pan disposed lengthwise between said mechanisms and having side walls and intermediate guide elements all of which converge toward the cleaning mechanism so as to distribute the grain in a stream of uniform density to the cleaning mechanism.

5. In a combine, means for conveying grain from the threshing mechanism to the cleaning mechanism, comprising a pan disposed lengthwise between said mechanisms and inclined downwardly and rearwardly and having side walls which converge toward the cleaning mechanism, the said pan also having an apron extending from its delivery end laterally beyond said side walls, and said apron being sloped downwardly toward the cleaning mechanism at a substantial pitch with respect to the pan surface.

6. In a combine, means for conveying grain from the threshing mechanism to a relatively narrower cleaning mechanism, comprising a pan disposed lengthwise between said mechanisms and having side walls which converge toward said cleaning mechanism, and guide strips secured on the pan between the side walls, said guide strips also converging toward the cleaning mechanism, and both the side walls and guide strips terminating short of the delivery end of the pan to permit the grain and other material to spread into a stream of uniform density as it passes over the discharge end of the pan and to the cleaning mechanism.

7. In a combine, means for conveying grain from the threshing mechanism to a relatively narrower cleaning mechanism, comprising a pan disposed lengthwise between said mechanisms, said pan being rearwardly and downwardly inclined, a portion of the rear end of the pan constituting an apron with the apron being downwardly and rearwardly inclined at an angle greater than the angle of the forward portion of the pan, substantially parallel side walls for the apron portion of the pan, rearwardly converging side walls on the forward portion of the pan, and rearwardly converging grain guide means disposed on the upper face of the pan in spaced positions between said converging side walls.

8. In a combine, means for conveying grain from the threshing mechanism to a relatively narrower cleaning mechanism, comprising a pan disposed lengthwise between said mechanisms, said pan being rearwardly and downwardly inclined, a portion of the rear end of the pan constituting an apron with the apron being downwardly and rearwardly inclined at an angle greater than the angle of the forward portion of the pan, side walls for the apron and rearwardly converging side walls on the forward portion of the pan having their rear ends disposed inwardly of the opposite side walls of the apron whereby grain flows over the apron without collecting along the side walls thereof, and rearwardly converging guide ribs carried by the forward inclined portion of the pan for cooperation with the converging side walls of the pan to effect an even distribution and flow of grain rearwardly over the forward portion of the pan.

9. In a combine, means for conveying grain from the threshing mechanism to a relatively narrower cleaning mechanism, comprising a pan disposed lengthwise between said mechanisms, said pan being rearwardly and downwardly inclined, a portion of the rear end of the pan constituting an apron with the apron being downwardly and rearwardly inclined at an angle greater than the angle of the forward portion of the pan, side walls for the apron and rearwardly converging side walls on the forward portion of the pan having their rear ends disposed inwardly of the opposite side walls of the apron whereby grain flows over the apron without collecting along the side walls thereof, rearwardly converging guide ribs carried by the forward inclined portion of the pan for cooperation with the converging side walls of the pan to effect an even distribution and flow of grain rearwardly over the forward portion of the pan and the rearwardly converging side walls of the pan being flared upwardly and outwardly a substantial distance above the top face of the pan with their upper edges terminating outwardly of the opposite sides of the threshing mechanism.

10. In a combine, means for conveying grain from the threshing mechanism to a relatively narrower cleaning mechanism, comprising a pan disposed lengthwise between said mechanisms and having side walls which converge toward said cleaning mechanism, and grain guides arranged on the upper face of the pan in transversely spaced positions between said side walls, said guides also converging toward the cleaning mechanism and being operative in conjunction with said side walls to control the grain flow over the pan surface and deliver the grain in a stream of substantially uniform density to the cleaning mechanism.

11. In a combine having a threshing mechanism and a relatively narrower cleaning mechanism spaced rearwardly therefrom and at a lower level, means for conveying grain material from the threshing mechanism to the cleaning mechanism comprising an inclined pan disposed between the two mechanisms and adapted to receive material upon its upper forward surface from the threshing mechanism and deliver it rearwardly to the cleaning mechanism, rearwardly converging guides disposed in transversely spaced arrangement over a forward portion of the material receiving area of the pan, said guides being operative to separate the received material into spaced streams and then guide such streams in converging directions toward the discharge end of the pan where the material is united and discharged to the cleaning mechanism in a single stream of substantially uniform thickness.

12. In a combine having a threshing mechanism and a relatively narrower cleaning mechanism spaced rearwardly therefrom and at a lower level, means for conveying grain material from the threshing mechanism to the cleaning mechanism comprising an inclined pan disposed between the two mechanisms and adapted to receive material upon its upper forward surface from the threshing mechanism and deliver it rearwardly to the cleaning mechanism, rearwardly converging guides disposed in transversely spaced arrangement over a forward portion of the material receiving area of the pan, said guides being operative to separate the received material into spaced streams and then guide such streams in converging directions toward the discharge end of the pan where the material is united and discharged to the cleaning mechanism in a single stream of substantially uniform thickness, and means for actuating the pan to facilitate the flow of material rearwardly thereover.

ALFRED KORSMO.
MARTIN RONNING.